Figure 7:
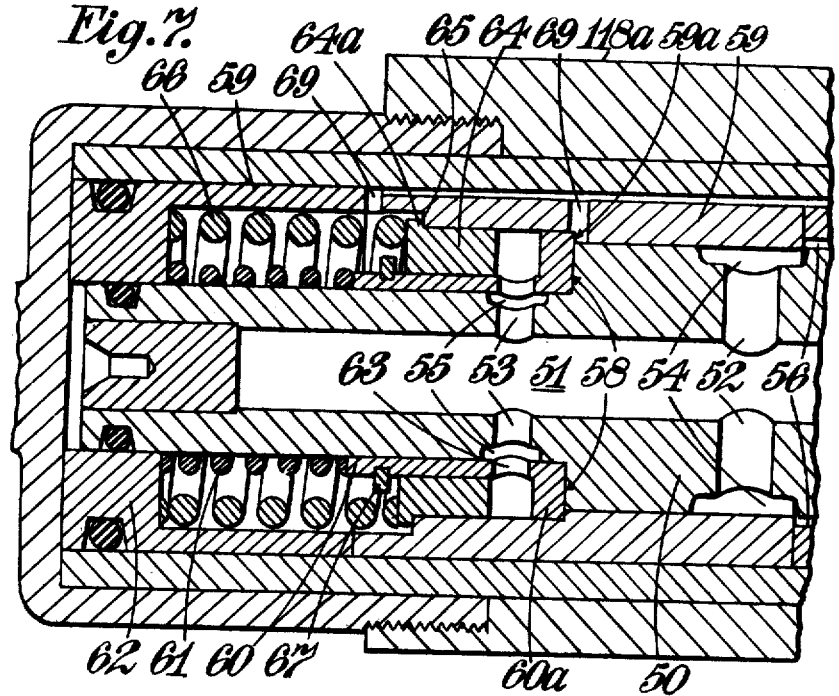

Jan. 26, 1960   W. G. HARDY ET AL   2,922,440
FLUID-PRESSURE-OPERATED MECHANISMS WITH CONTROL VALVE
Filed May 31, 1955   5 Sheets-Sheet 1
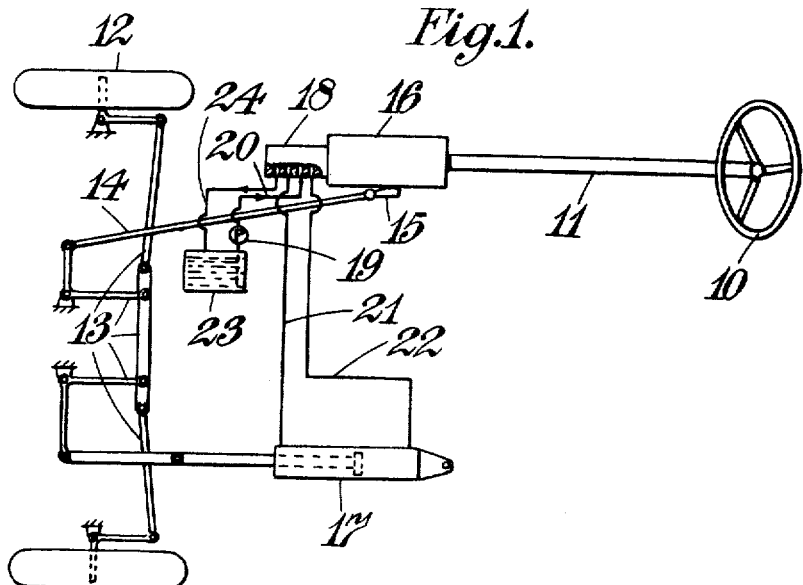
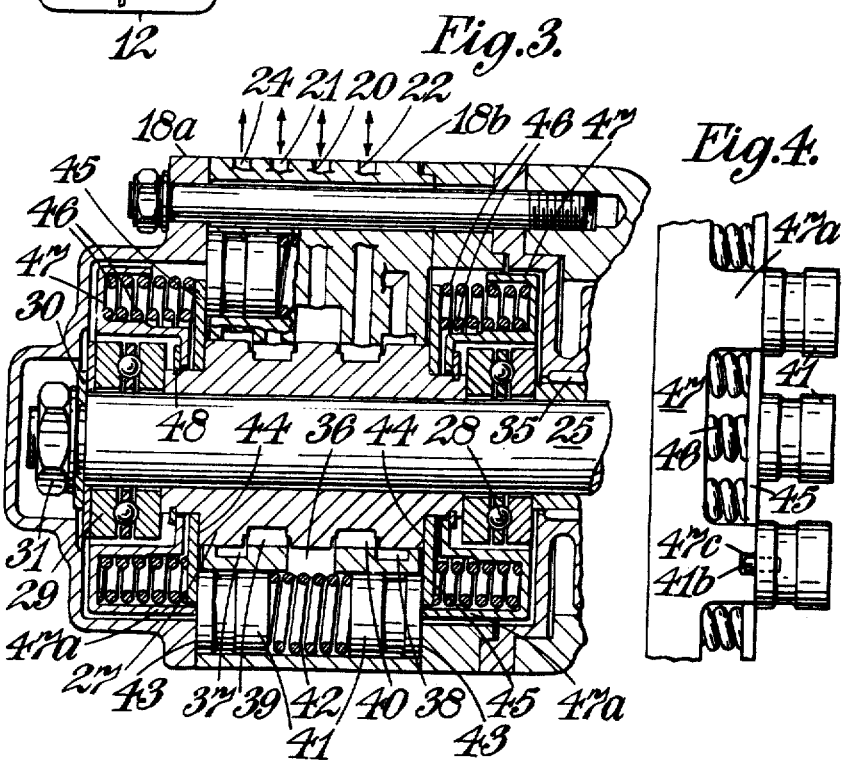

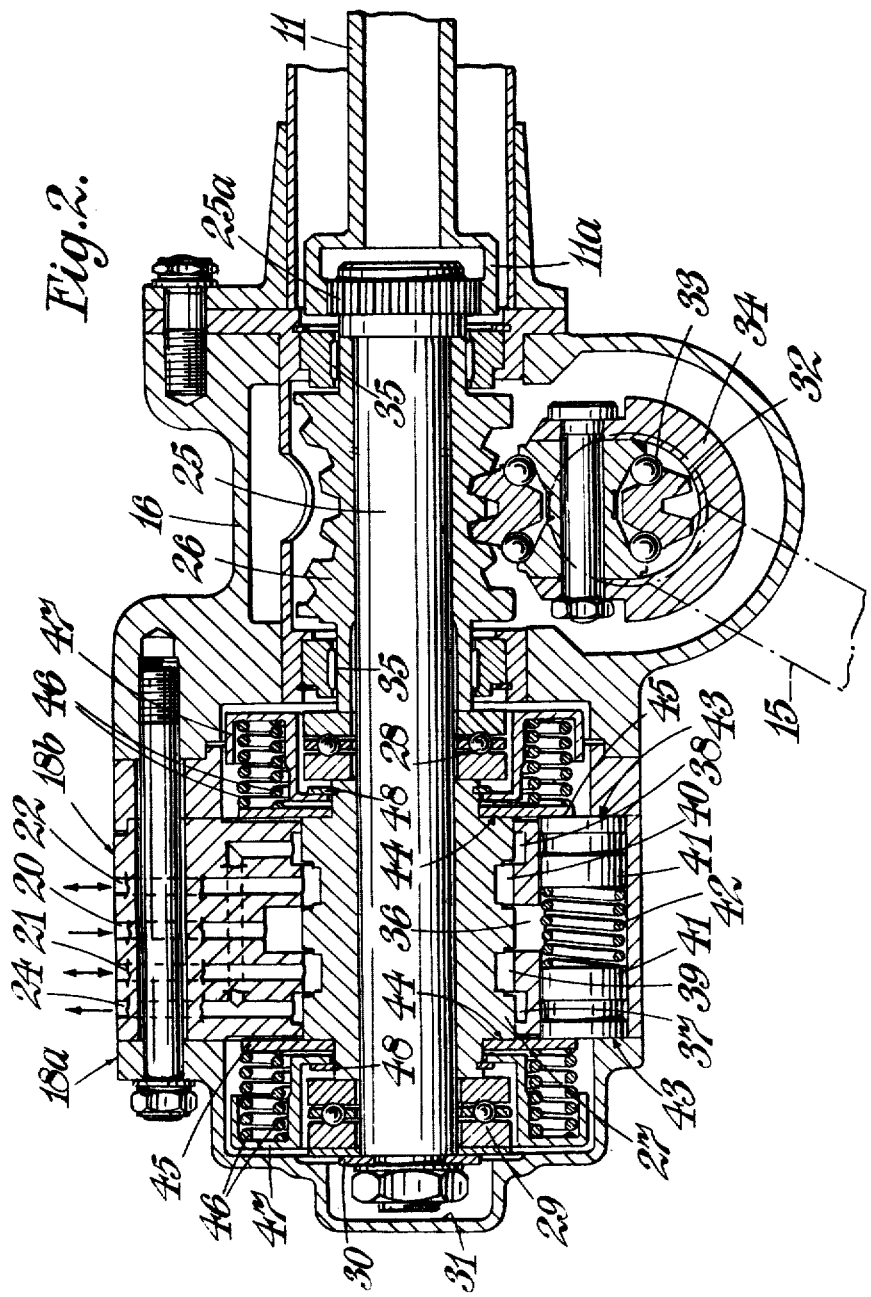

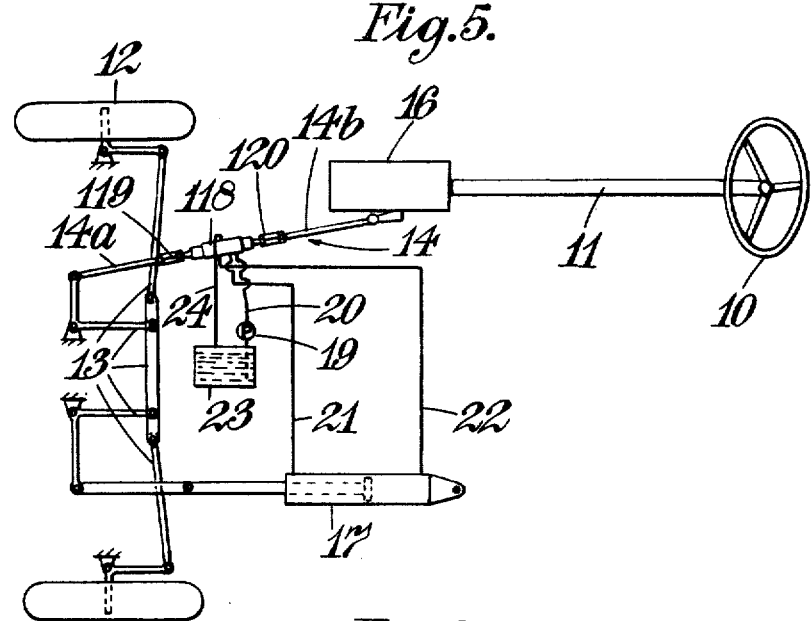
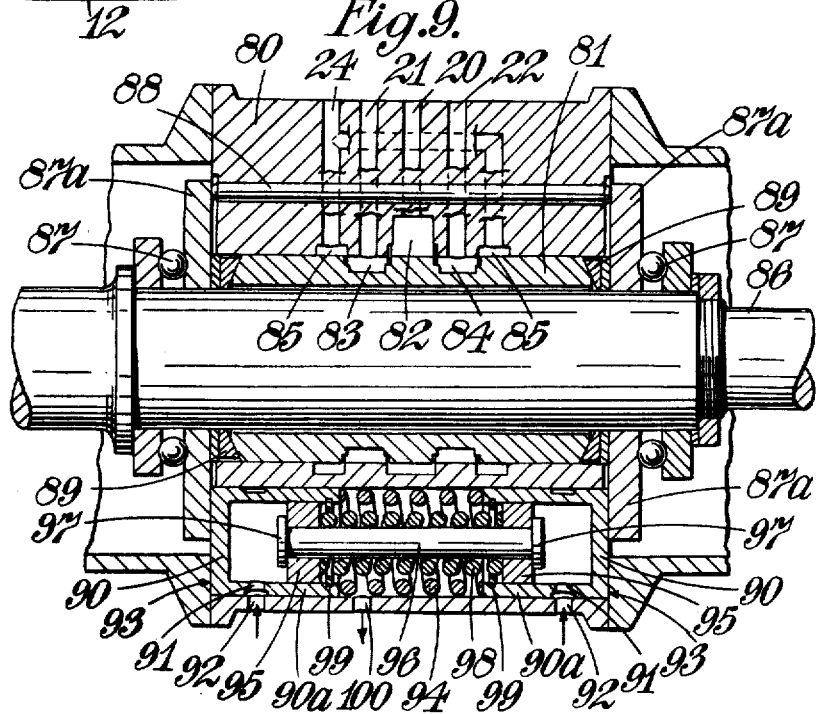

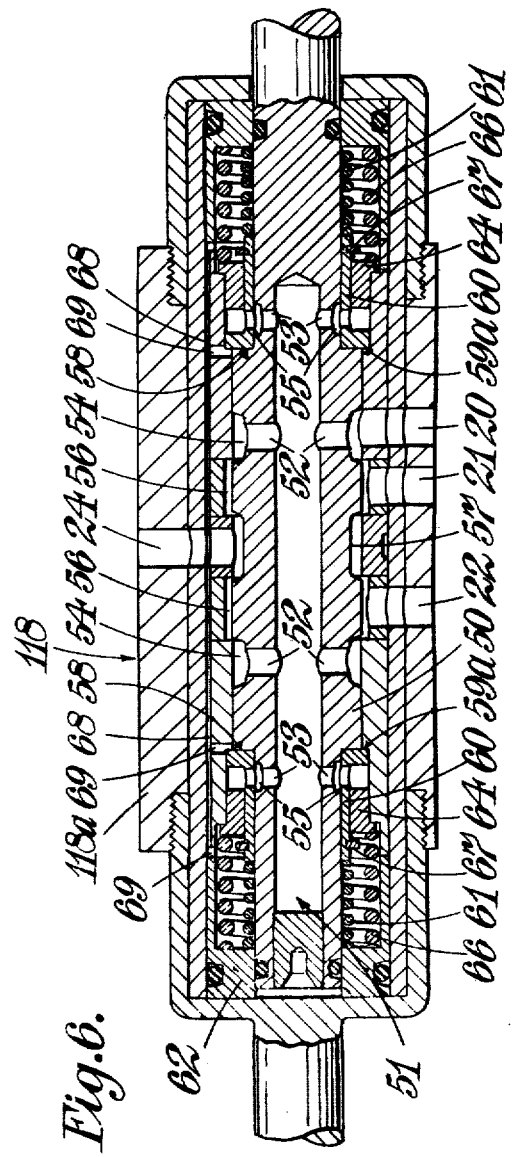

United States Patent Office 2,922,440
Patented Jan. 26, 1960

2,922,440

FLUID-PRESSURE-OPERATED MECHANISMS WITH CONTROL VALVE

William Guy Hardy, Nantwich, and Frank Henry Tarlton, Winsford, England, assignors to Rolls Royce Limited, Derby, England, a British company Application May 31, 1955, Serial No. 512,076

Claims priority, application Great Britain June 8, 1954

18 Claims. (Cl. 137—622)

This invention relates to fluid-pressure-operated mechanisms of the kind in which a valve is provided to control the fluid-pressure operative in the mechanism, the valve being of the type (hereinafter referred to as the type specified) adapted so that the fluid pressure varies in accordance with the extent of displacement of a valve element from a selected position, and adapted so that the fluid pressure acts to provide a reaction against said displacement.

The present invention has for an object to provide an improved form of valve of the type specified.

According to the present invention, a valve of the type specified has its displaceable valve element adapted so that the relationship between the reaction-opposing displacement and the fluid pressure is variable.

According to a preferred feature of this invention, the displaceable element of the valve is adapted so that the said relationship differs for different ranges of its displacement.

One known important use of a valve of the type specified is for controlling the fluid-pressure in an hydraulic motor of a power-operated steering mechanism of a wheeled vehicle, and in such a use the movable valve element is arranged for displacement from a central position in one direction or the other according to the direction in which it is desired to steer. The valve is arranged so that, as the displacement from the central position increases, the operating pressure increases, and it is also arranged that the operating pressure produces a reaction which bears a fixed relation to the pressure. This is achieved in one construction of valve by providing at each end of the movable valve element a corresponding reaction collar which is slidable on the valve element and is adapted to be loaded by the operating pressure to produce a load on the valve element directed towards the centre of the valve element when the valve element is moved in a direction towards the collar, and which collar comes up against a stop when the valve element is moved away from the collar so as not to apply a load to the valve element. In a second known construction of valve, this is achieved by providing pairs of plungers in bores parallel with the axis of the movable valve element. A spring may be provided in each bore, or in some of the bores to urge the associated plungers apart against fixed abutments and against abutments which are fixed relative to the movable valve element, the operating pressure being caused to act on the adjacent ends of the plungers; thus when the valve element is moved it displaces one plunger of each pair away from the fixed abutments and against the sum of the spring loads and the fluid pressure loads on the plungers which are being displaced by the valve element.

The present invention can be employed with advantage in both these known forms of valve of the type specified. For instance, in the first described known form of valve there may be provided in association with each reaction collar, a further element adapted to be loaded by the operating pressure to move in a direction away from the centre of the valve element against a spring load and to come up against a stop carried by the reaction collar when the operating pressure attains a selected value. At operating pressures above the selected value, the reaction is equal to the pressure load on the reaction collar minus the pressure load on the further element plus any spring load tending to oppose displacement of the valve element. The effective area of the further pressure-loaded element may be equal to or different from that of the reaction collar and by suitable selection of the springs and these areas a desired variation of the reaction may be obtained.

In the second above described known form of valve, the plungers may be arranged to bear on the movable valve element through abutments which are resiliently connected with the movable valve element through springs of such load when assembled as to be overcome by the forces applied by the plungers to the movable valve element only after a predetermined operating pressure is reached; thus when the operating pressure reaches this predetermined value the displaced plungers are moved against the action of the resilient connections until they abut their fixed abutments, and the valve element is moved only against the load of said resilient connections. Alternatively, the pairs of plungers may be formed internally as cylinders which are open at their adjacent ends and which have the pressure fluid fed thereto, and each cylinder accommodates a corresponding piston element, the piston elements being urged apart resiliently against stops which are separate from the plungers and which limit the separation of the piston elements, said piston elements being displaceable by the fluid pressure in the cylinders against the resilient load and being adapted at pressures above a preselected value to come up against stops carried by the plungers. When a piston element comes up against its associated stop on the corresponding plunger, further movement of the valve element causes the reaction load tending to oppose displacement of that plunger to rise at a reduced rate dependent upon the effective area of the piston relative to the effective area of the cylinder within which it works.

According to a preferred feature of the last described arrangement of this invention, the pair of piston elements associated with a pair of plungers are slidably mounted on a common rod which carries at its ends abutments limiting the separation of the piston elements and the resilient load urging the piston elements apart is afforded by a spring encircling the rod. In this case the change in the relationship between the reaction load and the fluid pressure within the cylinder will depend upon the effective area of the rod, and the smaller the effective area of the rod the greater will be the change in the relationship. The stops carried by the plungers are conveniently in the form of circlips received in grooves in the walls of the cylinders for the piston elements.

Some wheeled vehicle steering arrangements incorporating preferred forms of valve of this invention will now be described with reference to the accompanying drawings, in which—

Figure 8:
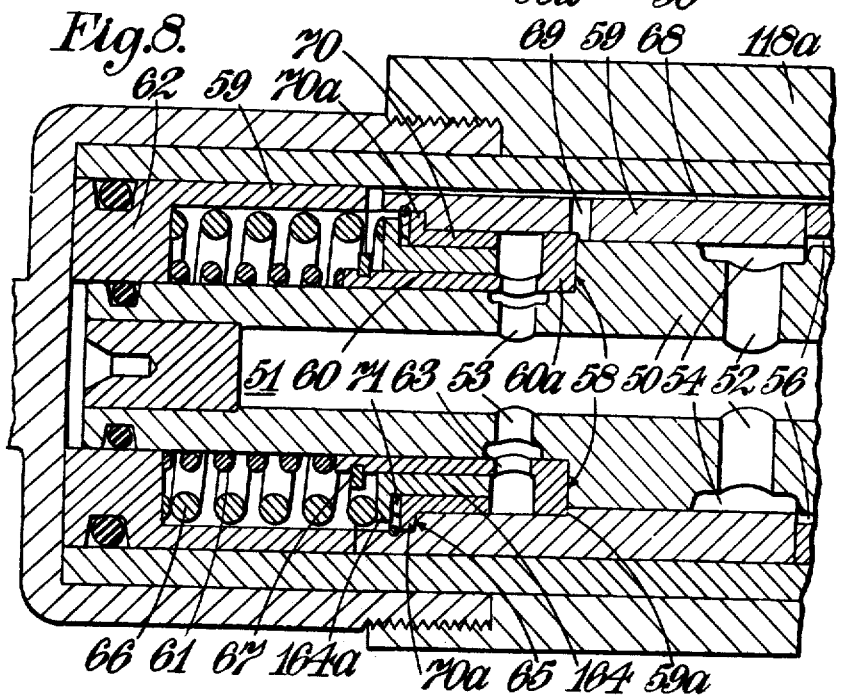

Figure 1 illustrates diagrammatically a vehicle steering arrangement,

Figure 2 is a section through part of the steering arrangement of Figure 1 showing details of the control valve and its mode of operation, Figure 3 is a view similar to Figure 2 showing a modification, Figure 4 is a developed view of a part of Figure 3, Figure 5 is a view similar to Figure 1 of a second steering arrangement, Figure 6 is a section through one form of control valve suitable for use with the steering arrangement of Figure 5, Figure 7 is a view of one end of Figure 6 to a larger scale, Figure 8 is a view corresponding to Figure 7 of a second form of valve for use with the steering arrangement of Figure 5, Figure 9 is a section through yet another form of control valve suitable for use with the arrangement of Figure 1.

Referring to Figure 1, the steering arrangement shown comprises a steering wheel 10 and a steering column 11, steerable wheels 12 connected by a linkage 13 of any known or suitable kind, a drag link 14, a drop arm 15, a steering box 16, and hydraulic motor 17 to which liquid under pressure is supplied under control of a valve 18 and which assists in turning the road wheels 12 through the linkage 13. On turning the steering wheel 10, the drop arm swings actuating the drag link 14 and thus rotating the wheels 12. The reaction in the steering box causes actuation of the valve and thus controls the power supply to the hydraulic motor 17.

The hydraulic motor is supplied with pressure liquid by a pump 19 through conduit 20, valve 18 and one or the other of conduits 21, 22, and the return liquid flow back to reservoir 23 through the other of the conduits 21, 22, valve 18 and return conduit 24.

Referring now to Figure 2, the steering column 11 is shown as having an internally splined end 11a with which engages a splined head 25a of a spindle 25 which has secured on it a worm 26 and has mounted on it a movable valve element 27 of the valve 18, there being a thrust bearing 28 between the worm 26 and valve element 27 and a second thrust bearing 29 between the valve element 27 and an abutment member 30 held on the end of the spindle 25 by nut 31. The worm 26 meshes with a cam element 32 mounted in bearings 33 in a cradle 34 which is mounted to rotate in the steering box about an axis at right angles to but offset from the spindle 25 and which carries the drop arm 15. The worm 26, spindle 25 and valve element 27 are mounted in the steering box through needle bearings 35, and thus the reaction of the cam element 32 on the worm created on rotation of steering column 11 causes the worm 26, spindle 25 and valve element 27 to move longitudinally within the steering box 16 and valve casing 18a thereby to control the pressure of the pressure liquid supply to the motor 17.

The valve casing has four supply ducts which are continuations of the conduits 20, 21, 22 and 24. The duct 20 leads to a central internal annular groove 36, the duct 24 leads to two symmetrically arranged internal annular grooves 37, 38 and the ducts 21, 22 lead to the inner surface of the casing symmetrically between the grooves 36 and 37 and between the grooves 36 and 38 respectively to communicate with annular grooves 39 and 40 respectively. The groove 39 slightly overlaps grooves 37 and 36, and the groove 40 slightly overlaps grooves 36, 38.

With the valve element 27 in its central position, corresponding to straight travel, there are equal leaks from groove 36 into grooves 39, 40 and thus into grooves 37, 38, so that the pressures in ducts 21, 22 are equal and the motor 17 is not operated. On displacement of the valve element 27, the overlap of the grooves is made unequal and the pressure in one of the grooves 39, 40 increases and that in the other decreases so operating the motor 17. Thus on movement to the left of the valve element, the pressure in groove 40 increases and that in groove 39 decreases.

The valve casing 18a is formed with a ring of bores the axes of which are parallel to the spindle 25, and in each of which bores there is a pair of plungers 41 separated by a spring 42.

When the valve element 27 is in its central position, corresponding to straight travel, the plungers 41 are held by their separating springs 42 against fixed, axially facing abutments 43 on the valve casing 18a. The bores are in communication with the pressure fluid inlet duct 20 through groove 36 so that the plungers 41 are loaded on their adjacent ends by the operating pressure.

The plungers 41 also act on the movable valve element 27 in the following way. A pair of annular axially-facing shoulders 44 are formed on the valve element by reducing the diameter of its ends, the spacing of the shoulders 44 being equal to that of the abutments 43 on the casing, and the shoulders 44 each facing in the opposite direction to the adjacent abutment 43 on the casing 18a. A pair of washers 45 are mounted on the reduced diameter ends of the valve element 27 and they have a radial extent to be engaged by the outer ends of the plungers 41 and they are held in contact with the shoulders 44 on the valve element by secondary springs 46, the inner ends of which abut the washers 45 and the outer ends of which abut annular abutment members 47 which are carried on the reduced ends of the valve element 27 and bear against retaining circlips 48.

The set-up loads of the secondary springs 46 are selected so that in use:

(a) during a first part of the displacement of the valve element 27 from its central position, the secondary springs 46 do not give and so the washers 45 are held against the shoulders 44 and act to displace the appropriate plungers 41 against the plunger springs 42 and the fluid pressure load on the plungers 41, and (b) during a second part of the displacement of the valve element 27, the load of secondary springs 46 on the washer 45 is overcome by the combined effect of the springs 42 and the hydraulic load on the plungers 41 which therefore move back to a position against the fixed abutment 43 on the casing 18a, and the valve element 27 is displaced solely against the load of the secondary springs 46.

Referring now to Figure 3, there is shown a modification of the arrangement of Figure 2 in which some only of the plungers 41 are allowed to move back to a position against the fixed abutments 43 on the casing 18a. This effect is achieved in the following manner: axially-extending projections 47a are formed on each of the annular abutment members 47 axially in line with some of the plungers 41, the projections 47a being of such axial length that they contact the corresponding plungers 41 when the valve element is in the position for straight travel of the wheeled vehicle. During a first part of the displacement of the valve element 27 from its central position, the reaction load on each displaced plunger 41, due to the load of corresponding spring 42 and the pressure of the pressure liquid on the plunger, is taken directly by the annular abutment member 47 through the projections 47a in the case of the plungers 41 abutting a projection, and through the washer 45 and secondary springs 46 in the case of the other displaced plungers, as described in relation to Figure 2. During a second part of the displacement of the valve element 27, the load from the plungers 41 not co-operating with a projection 47a becomes sufficient to compress the secondary springs 46, and these plungers 41 move back onto their abutments 43 as in Figure 2. However, the displaced plungers 41 co-operating with projections 47a remain lifted from their abutments 43 and thus continue to apply loads to the valve element 41 via the annular abutment member 47.

Figure 4 is a developed view of the annular abutment member 47 of Figure 3 showing two plungers 41 co-operating with axially-extending projections 47a, and one plunger making contact with the washer 45 only. Also shown is a peg 41b protruding from one of the plungers 41 and co-operating with a cutaway 47c in one of the axial projections to maintain the annular abutment member in correct relationship to the plungers 41.

Referring now to Figure 5 in which the same reference numerals as are used in Figure 1 are employed to indicate like parts, there is shown a steering arrangement in which the control valve for controlling the supply of operating liquid to the motor 17 is connected in the drag line 14 instead of being combined with the steering box 16. The valve in this case is indicated at 118 and the drag link is made in two parts 14a and 14b, of which the part 14a is connected through a threaded sleeve 119 to the casing of the valve element 118 and of which the drag link part 14b is connected through a threaded sleeve 120 to the movable valve element of the valve 118.

The valve 118 in this case may conveniently be constructed as shown for example in Figures 6 to 8.

Referring now to Figures 6 and 7, the valve comprises an elongated casing 118a provided adjacent its mid length with four unions which form continuations of the conduits 20, 21, 22 and 24 and are correspondingly referenced.

The valve casing 118a is fitted internally with a number of liner sleeves 59 of different diameters which abut end-to-end, and there is slidably arranged within the liner sleeves 59 a valve element 50 which has a central bore 51 running along it which is closed at one end and plugged at its opposite end. The valve element 50 is also formed with a number of cross bores 52, 53 leading to annular grooves 54, 55 in its surface from the central bore. The grooves 54 overlap slightly grooves 56 in the casing liners aligned with unions 21, 22, and the grooves 56 in turn overlap slightly a groove 57 formed in the valve element 50 to be aligned with union 24. Thus with the valve element 50 in the central position, that is a position corresponding to straight travel (a) pressure fluid is delivered into the central bore 51 from the union 20, (b) there are equal leaks from bore 51 to the union 24 leading to the reservoir on the inlet side of the pump 19, through each cross bore 52 and corresponding grooves 54, 56, 57, (c) there are like connections through the bores 52 and annular grooves 54, 56 to each of the unions 21, 22 leading to the hydraulic motor 17 whereby these fluid pressures acting at each end of the fluid motor are equal.

When the valve element 50 is displaced from its central position by tension or compression in the drag link 14, the leakage path for the pressure fluid to the union 24 is increased in its restriction so that the fluid pressure within the central bore 51 increases, and simultaneously the effective area of the connection between the central bore 51 and one end of the hydraulic motor 17 is increased and the effective area of the connection between the other end of the hydraulic motor 17 and the central bore 51 is decreased.

The ends of the valve element 50 are reduced in diameter so as to provide adjacent each end thereof an axially-facing annular shoulder 58, the shoulder 58 at one end of the valve element 50 facing away from the shoulder 58 at the opposite end of the valve element. The liner sleeves 59 are provided with correspondingly facing shoulders 59a at such positions that the shoulders 58, 59a are coplanar when the valve element 50 is in its central position.

Slidably mounted on each end of the valve element 50 is a corresponding reaction collar 60 which is internally of cylindrical form to slide on the corresponding end of the valve element and which is externally of stepped cylindrical form to provide a portion 60a of enlarged diameter to co-operate with the shoulders 58, 59a provided on the valve element and the adjacent liner sleeve and to fit within the bore of the adjacent sleeve 59, and a portion of smaller diameter which extends from the larger diameter portion 60a on the side of it away from the shoulder 58 and with a clearance from the liner sleeves 59. Reaction collar springs 61 encircle the reduced diameter portions of the valve element, one at each end thereof, and each spring 61 bears by one end on the corresponding reaction collar 60 to urge its larger diameter portion into co-operation with the adjacent shoulders 58, 59a and by its opposite end on an internal flanged portion 62 of a liner sleeve.

The cross bores 53 provided in the valve element lead from the central bore 51 thereof to ports 63 formed in the reaction collars 60 to lead from their cylindrical inner surfaces to the smaller diameter external surface portions thereof, whereby the reaction collars 60 are loaded by the fluid pressure within the central bore 51 against the shoulders 58, 59a provided on the valve element 50 and the liner sleeves 59.

Slidably mounted on the smaller diameter portion of each reaction collar 60, there is an annular member 64 which fits externally within the adjacent liner sleeve 59 and which is provided at its end remote from the enlarged portion 60a of the reaction collar 60 with a radially-outwardly directed flange 64a to co-operate with an axially-facing shoulder 65 on the adjacent liner sleeve 59 to limit its travel towards the enlarged diameter portion 60a of the reaction collar 60. A spring 66 is provided to encircle the smaller diameter portion of the valve element 50 and to bear by one end on the annular member 64 and by its opposite end on the internal flange 62 of the liner sleeve above mentioned. The smaller diameter portion of the reaction collar 60 is fitted with a circlip 67 which, when the reaction collar 60 is against the shoulders 58, 59a of the valve element 50 and liner sleeve 59 and the radial flange 64a is in abutment with its shoulder 65 on the liner sleeve 59, is spaced axially away from the end of the annular member 64 remote from the enlarged portion 60a of the reaction collar 60. The annular member 64 has such an axial length that, when the parts are situated as just specified, it is spaced from the enlarged portion 60a of the reaction collar 60 and is on the side of the corresponding port 63 away from the enlarged portion 60a of the reaction collar 60, so that the fluid pressure tending to hold the reaction collar 60 against its shoulder 58 also tends to displace the annular member 64 away from the enlarged portion 60a of the reaction collar 60 toward circlip 67 against the action of the spring 66.

With this construction the effective areas of the annular member 64 and of the enlarged portion 60a of the reaction collar 60 on which the fluid at control pressure operates are equal.

In operation, when the valve element 50 is moved from the central position corresponding to straight travel of the wheeled vehicle, the reaction collar 60 adjacent the end of the valve casing 118a away from which the valve element 50 is moving, is left behind by the valve element, this collar being held against its shoulder 59a on the adjacent liner sleeve 59, but the reaction collar 60 adjacent the opposite end of the valve casing 118a is moved by the valve element 50 off its shoulder 59a on the adjacent liner sleeve 59 and so, in moving the valve element 50, a fluid pressure load must be overcome equal to the area by which the cross-section of the enlarged portion 60a of the reaction collar exceeds the cross-section of the smaller portion multiplied by the control pressure. As is known, the control pressure increases according to the extent by which the valve element 50 is displaced from the central position and thus, as the control pressure increases, the annular member 64 will be moved away from its shoulder 65 against the action of its spring 66 until at a selected value of the control pressure, the annular member 64 has moved sufficiently to come up against the circlip 67, and, when this position is reached, the fluid pressures on the reaction collar 60 and annular member 64 balance one another so that further movement of the valve element 50 is against the action of associated springs 61 only.

In order that the pressure behind the enlarged portion 60a of the reaction collar and in the space occupied by the springs 61, 66 shall be a low pressure, a channel 68 is cut in the liner sleeves 59 to extend from union 24 to ports 69 leading to behind the reaction collar 60 and to the spring space.

Referring now to Figure 8, there is shown a similar arrangement to that in Figures 6 and 7. In this arrangement the effective areas of the enlarged portion 60a of the reaction collar 60 and of the annular member 164 are different. This is achieved by making the external diameter of the annular member 164 less than the adjacent liner sleeve 59 and fitting within the liner sleeve 59 a bush 70 within which the annular member 164 slides. The bush 70 is provided with a radial flange 70a which co-operates with the shoulder 65 on the adjacent liner sleeve 59 and provides an abutment for the radial flange 164a on the annular member 164. The radial flange 70a on the bush 70 is provided with axial projections 70b to keep the radial flanges 70a, 164a slightly apart to accommodate a retaining snap-ring.

With this construction the operation is similar to that above described with reference to Figures 6 and 7, except that when the annular member 164 comes up against the circlip 67 the fluid pressure loads on the reaction collar 60 and on the annular member 164 are not balanced but there is a resultant load tending to oppose the displacement of the valve element 50.

Referring now to Figure 9, there is shown another form of control valve. The valve comprises a casing 80 provided with a number of unions which form continuations of the conduits 20, 21, 22 and 24 and are correspondingly referenced.

The valve also comprises a movable valve element 81 slidably within the valve casing 80, and the casing 80 and the valve element 81 are formed with a number of overlapping annular channels 82, 83, 84, 85 so that with the movable valve element in a central position corresponding to straight travel of the vehicle, the delivery conduit 20 of the pump is connected by paths of equal restriction to the conduits 21, 22 leading to the ends of the hydraulic motor and is also connected through further restrictions to the conduit 24 leading back to the reservoir. When the valve element 81 is displaced from its central position, the restriction of the path to the reservoir is arranged to be increased and simultaneously the restriction of one of the connections to the hydraulic motor is increased and the effective restriction of the other connection to the hydraulic motor is decreased.

The movable valve element is arranged to be displaced from its central position by rotation of the steering wheel, which may for instance be adapted to displace a shaft 86 axially of itself, the rod extending through the valve element 81 and being connected with it through thrust bearings 87 at each end of the valve element 81. The races of the thrust bearing 87a which co-operate with the valve element are conveniently held in accurate spaced relation by means of spacer rods 88 extending through bores in the fixed structure of the valve and engaging by their ends on the two races 87a. In this way the thrust bearings 87 can be pre-loaded towards one another without loading up the movable valve element 81. Also, if desired, the movable valve element may be provided with spherical ends and similarly shaped seating rings 89 may be provided between the movable valve element 81 and the thrust bearings 87. In this way the movable valve element 81 can align itself with the bore in the valve casing 80 without imposing any loads on or being resisted by the fittings by which it is connected to the operating shaft 86.

The valve casing 80 is formed with a number of cylinder bores which have their axes parallel to the axis of the operating shaft 86 and are disposed in the casing in annular formation about the movable valve element 81, and the races 87a of the thrust bearings 87 are arranged to overlap the ends of these bores.

Each bore contains a pair of plungers 90 each of which has a crown directed away from the other plunger of the pair and has a skirt 90a which forms within each plunger a cylinder space which is closed at its end remote from the associated plunger and is open at its end adjacent the associated plunger. The plungers 90 have ports 91 formed in them which overlap unions 92 leading to the pump delivery so that the pressure within the plungers 90 is the operating pressure.

The pairs of plungers 90 are urged apart and into contact with the adjacent thrust bearing races 87a and into contact with fixed abutments 93 on the valve casing 80 by a coil spring 94 which bears on the ends of the skirts 90a.

Each cylinder space within a plunger 90 contains a piston 95 and the pistons 95 of each pair of associated plungers are slidably mounted on a common rod 96 which is provided with a shoulder 97 at each end to limit the separation of the pistons 95 under the influence of a coil spring 98 encircling on the rod 96 between the pistons 95. Means is provided to limit the travel of each piston 95 in its cylinder in a direction towards the other piston 95 and this means conveniently comprises circlips 99 engaged in internal peripheral grooves in the skirts 90a. The space between the pistons 95 is connected through union 100 to the reservoir.

With the valve element 81 in its central position each piston 95 is against the shoulder 97 on the adjacent end of the rod. On displacement of the operating shaft 86 in one direction the appropriate thrust bearing race 87a moves one plunger 90 of each pair of plungers away from its fixed abutment 93. Also as the movable valve element 81 is displaced so the pressure within the plungers 90 increases and as a result the reaction to the displacement of the movable valve element 81 is determined by the load of the spring 94 holding the plungers 90 apart and by the effective area of the cylinder within the displaced plungers 90 multiplied by the operating pressure.

When the operating pressure reaches a preselected value, the fluid load on the pistons 95 within the plungers 90 has moved the pistons against the action of the spring 98 to such an extent that the pistons 95 come up against their circlip stops 99 so that each forms effectively a part of the associated plunger 90, thereby reducing the fluid pressure load by an amount dependent upon the effective area of the pistons 95.

The greater the cross-sectional area of the rod 96 upon which the pistons 95 slide, the smaller is the amount by which the fluid pressure reaction load is decreased.

The arrangements of this invention have the advantage in their application to steering mechanisms of the power-assisted type, that the relationship of the reaction opposing the manual displacement of the valve element to the control pressure can be varied in operation so that for instance for high operating pressures excessive reactions are not experienced.

We claim:

1. A control valve comprising a valve body provided with a pressure-fluid-inlet port, a pressure-fluid-outlet port and an exhaust port; a valve element slidable within the valve body between first and second positions, providing communication between said ports and co-operating with the said ports to increase the effective area of communication between said inlet port and said outlet port and to decrease the effective area of communication between the inlet port and exhaust port as the valve element moves from said first position towards the second position and to cause during said movement a progressive increase in the fluid pressure at the inlet port; resilient means urging the valve element towards said first position; and means responsive to the fluid pressure at the inlet port for applying to the valve element a fluid-pressure load to oppose movement of the valve element from its first position to its second position, and including a slidable member having said pressure-fluid pressure applied thereto to urge said member to slide in one direction, resilient means urging said member to slide in the opposite direction on said movement of the valve element, and abutment means against which the said slidable member comes into abutment when the pressure-fluid pressure rises to a preselected value to relieve at least part of said fluid-pressure load opposing said movement of the valve element.

2. A control valve comprising a valve body provided with a pressure-fluid-inlet port, a pressure-fluid-outlet port and an exhaust port; a valve element slidable within the valve body between first and second positions, providing communication between said ports and co-operating with the said ports to increase the effective area of communication between said inlet port and said outlet port and to decrease the effective area of communication between the inlet port and exhaust port as the valve element moves from said first position towards the second position and to cause during said movement a progressive increase in the fluid pressure at the inlet port; resilient means urging the valve element towards said first position; slidable plunger means urged to move with the valve element during movement of the valve element from said first position towards said second position, means applying to said plunger means pressure-fluid at substantially the same pressure as that at said pressure-fluid-inlet port to oppose said movement of the plunger means and of the valve element; and means affording an abutment face wtih which said plunger means comes into abutment when the pressure of the pressure fluid rises to a preselected value to relieve at least part of the force opposing said movement of the valve member, which force is exerted by the plunger means due to the fluid-pressure.

3. A control valve as claimed in claim 2 wherein the plunger means comprises a plurality of plungers which are movable in a direction parallel to direction of movement of the valve element, each plunger having two end surfaces, whereof one end surface faces in the direction of said movement and whereof the other end surface faces in the opposite direction to that of said movement, abutment means afforded by said valve body and co-operating with said other end surface of the plunger, first spring means acting on said one end surface of the plungers and urging the plungers against said abutment means; said valve member having a part affording a platform facing in the direction of said movement and having shoulder means facing said platform, an axially-movable thrust plate co-operating with said shoulder means and second spring means extending between the platform and thrust plate to hold the latter against the shoulder means, said thrust plate abutting said other end face of the plungers during said movement of the valve member, whereby on application of force to displace the valve member from its first towards its second position, the force is transmitted from said platform through the second spring means to the thrust plate, and thence to the plungers against the restraint of the first spring means and the pressure of said pressure-fluid acting on the plungers.

4. A control valve as claimed in claim 3, wherein the first spring means and the second spring means are preloaded, the preloading on said second spring means being greater than that on the first spring means.

5. A control valve as claimed in claim 3, wherein some of the plungers are in abutment with a part of the valve element.

6. A control valve comprising a valve body provided with a pressure-fluid-inlet port, first and second pressure-fluid outlet ports, and exhaust port means; a valve element cooperating with and affording communications between said ports and slidable within said body in a first direction from a central position in which the inlet and outlet ports communicate with the exhaust port means, to a first operating position in which the inlet port communicates with the said first outlet port and the second outlet port communicates with the exhaust port means, and slidable from said central position in a direction opposite to said one direction to a second operating position in which the inlet port communicates with said second outlet port and the first outlet port communicates with the exhaust port means, said valve element varying communication between the ports in the sense to increase progressively the fluid pressure at the inlet port as the valve element moves away from its central position; resilient means urging the valve element to said central position; slidable plunger means movable by the valve element during movement of the valve element from its central position towards its operating positions; means to apply to said plunger means pressure-fluid at substantially the same pressure as that at said pressure-fluid-inlet to oppose movement of the valve element from said central position, and abutment means with which the plunger means comes into abutment when the pressure of the pressure fluid rises to a preselected value and which acts to relieve at least part of the force which is exerted by the plunger means in opposing said movement of the valve element from its central position.

7. A control valve comprising a valve body provided with a pressure-fluid-inlet port, a pressure-fluid-outlet port and an exhaust port; a valve element slidable within the valve body between first and second positions, providing communication between said ports and co-operating with the said ports to increase the effective area of communication between said inlet port and said outlet port and to decrease the effective area of communication between the inlet port and exhaust port as the valve element moves from said first position towards the second position and to cause during said movement a progressive increase in the fluid pressure at the inlet port; resilient means urging the valve element towards said first position; the valve element having a part affording a surface facing the direction of said movement; a reaction member having sliding engagement with the valve element and affording a surface facing the first said surface, a pressure space being defined between first and second said surfaces; means to supply to said pressure space pressure-fluid at a pressure substantially equal to that at said pressure-fluid inlet, resilient means urging said reaction member towards the first said surface; and the reaction member having an abutment with the valve housing to prevent the first and second said surfaces touching, and having an abutment with the valve element which limits the maximum distance which can separate first and second surfaces.

8. A control valve as claimed in claim 7, wherein an annular chamber is afforded between the valve housing and an end portion of the valve element, and the reaction member slides in the chamber.

9. A control valve as claimed in claim 7, wherein said surface of the reaction member has an effective area equal to that of said surface afforded by a part of the valve element.

10. A control valve as claimed in claim 7, wherein said surface of the reaction member has an effective area different from that of said surface afforded by a part of the valve element.

11. A control valve comprising a valve body provided with a pressure-fluid-inlet port, a pressure-fluid-outlet port and an exhaust port; a valve element slidable within the valve body between first and second positions, providing communication between said ports and co-operating with the said ports to increase the effective area of communication between said inlet port and said outlet port and to decrease the effective area of communication between the inlet port and exhaust port as the valve element moves from said first position towards the second position and to cause during said movement a progressive increase in the fluid pressure at the inlet port; resilient means urging the valve element towards said first position; a plurality of hollow plungers slidable in a direction parallel to the direction of movement of the valve element and abutting the valve element on movement of the valve element from said first position towards said second position, each plunger affording an internal surface facing in a direction of said movement of the valve element; a rod associated with each respective plunger; a reaction member slidably engaged on each rod and slidably engaged within the associated plunger, said reaction member affording a surface which faces said internal surface, and the said surfaces defining between them a pressure space; means to supply to said pressure space pressure-fluid at a pressure substantially equal to that at said pressure-fluid inlet, resilient means urging each reaction member towards said internal surface of the associated plunger, abutment means on each rod limiting the travel of the reaction member towards said internal surface, and further abutment means in each plunger limiting the travel of the associated reaction member away from said internal surface.

12. A control valve as claimed in claim 11, wherein the valve element has a symetrical part-spherical convex surface at each end thereof and is provided with a bore extending parallel to the direction of movement of the valve element, and wherein a control rod having a clearance from the valve element extends through the bore, the control rod having secured thereon two seating rings, each of which has a concave part-spherical surface cooperating with the respective end surface of the valve element, said seating rings having a clearance from the valve body.

13. A control valve as claimed in claim 11, wherein the valve element is mounted on a control rod and spaced thrust surfaces are provided on the control rod, between which surfaces the valve element is located, and a plurality of thrust rods are provided extending through the valve body between said thrust surfaces.

14. In a power hydraulic steering system having a directional hydraulic fluid control valve and a fluid motor having two sides, the combination of: a pair of fluid chambers, means communicating to one chamber a fluid pressure proportional to the fluid pressure in one side of said motor, means communicating to the other chamber a fluid pressure proportiate to the fluid pressure in the other side of said motor, mechanically interconnected fluid pressure responsive force transmitting means exposed to said proportionate fluid pressures in said chambers, other fluid pressure responsive means positioned in said chambers exposed to and movable by said proportionate pressures, spring means opposing such movement of the last mentioned pressure responsive means, mechanically interconnected force transmitting means supporting said spring means, and arranged for relative movement with respect to said mechanically interconnected fluid pressure responsive force transmitting means, and stop means fixed relative to said mechanically interconnected fluid pressure responsive force transmitting means for limiting spring opposed movement of said other fluid pressure responsive means.

15. The subject matter of claim 14, wherein said mechanically interconnected fluid pressure responsive force transmitting means is a steering-wheel-connected member, and is adapted for movement by driver steering effort, and opposed in such movement by fluid pressure exerted thereagainst up to a limiting value of fluid pressure established by movement of said other pressure responsive means against said spring means to the point of abutment against said means.

16. A load-feel reaction device for a power steering system, comprising: a longitudinally bored body having end walls, a spool working in a bore in said body, stems on opposite ends of said spool projecting slidably through said end walls of said body, reaction rings surrounding said stems slidable longitudinally on said stems and in said bored body, stops fixed in said body limiting movement of said reaction rings toward said spool, there being pressure fluid chambers in said body between said reaction rings and the ends of said spool, and fluid passages for selectively conveying pressure fluid to said chambers, springs seated in and against said body engaging said reaction rings and yieldingly opposing movement of said rings by fluid pressure in said chambers, and stops on said stems engageable by said rings in the course of such movement against said springs to limit the force exerted by said springs against said body to a predetermined maximum.

17. A load feel reaction device for a power steering system having a pressure fluid source and a hydraulic motor having two sides, comprising: a longitudinally bored valve body having end walls, a valve spool working in a bore in said body, stems on opposite ends of said spool projecting slidably through said end walls of said body, reaction rings surrounding said stems slidable longitudinally on said stems and in said bored body, stops fixed in said body limiting movement of said reaction rings toward said spool, there being pressure fluid chambers in said body between said reaction rings and the ends of said spool, springs seated in and against said body engaging said reaction rings and yieldingly opposing movement of said rings by fluid pressure in said chambers, stops on said stems engageable by said rings in the course of such movement against said springs to limit the force exerted by said springs against said body to a predetermined maximum, and coacting valve elements and passageways in said spool and body for selectively controlling flow of pressure fluid from said source to one or the other side of said hydraulic motor and to a corresponding one of said pressure fluid chambers.

18. In a hydraulic power steering system having limited lost motion between a steering-wheel-connected member and a road-wheel-connected member, a fluid flow directing means operated by virtue of said lost motion, a reaction means movable relative to said members, means for exerting fluid pressure upon said reaction means, spring means acted upon by said reaction means, a stop engageable by said reaction means after limited movement against said spring means, said reaction means and said spring means being so arranged as, upon engagement of said stop by said reaction means, to limit, to the force exerted by the spring means, the force opposing relative motion between said steering-wheel-connected member and said road-wheel-connected away from a neutral position.

References Cited in the file of this patent

UNITED STATES PATENTS

| 2,213,271 | Davis | Sept. 3, 1940 |
| 2,583,197 | Armington | Jan. 22, 1952 |
| 2,695,035 | Brown | Nov. 23, 1954 |
| 2,719,511 | Presnell | Oct. 4, 1955 |
| 2,824,314 | Davis | Feb. 25, 1958 |

FOREIGN PATENTS

| 156,546 | Australia | May 17, 1954 |